Patented Dec. 27, 1927.

1,654,131

UNITED STATES PATENT OFFICE.

HERBERT T. LEO, OF CORONA, CALIFORNIA.

PROCESS OF EXTRACTING PECTIN FROM FRUIT.

No Drawing.   Application filed February 7, 1927.   Serial No. 166,598.

This invention relates to a process for extracting pectin from fruit and more particularly from citrus fruits, such as lemons and oranges.

I have found that pectin usually occurs in citrus fruits in such strength that one pound of the dry pectin will jell 400 pounds of sugar when the latter is present in a concentration of 65%. In heretofore known methods of extracting pectin from the mother substance, however, there are many contributing factors that lower this high jell strength. Some of these contributing factors arise from the fact that the residue of the citrus fruit, namely the peel which contains as much as 4% of pectin by weight, is dried in the presence of acids and enzymes; that the peel remains in contact with the existing enzymes and acid for a long time after the juice has been squeezed out; and that the first extracted pectin remains in contact with the acid solution during the remaining period necessary to extract all of the pectin. That the pectin strength actually deteriorates due to heat in the presence of small acid concentrations has been definitely proven.

It is therefore an object of this invention to provide a method for extracting pectin from fruits, wherein the time of contact of the pectin with acid solutions, and more particularly with heated acid solutions, is substantially reduced, the strength of the pectin thereby being maintained at its maximum point.

It is a further object of this invention to provide a more efficient process for extracting pectin from fruits by means of which pectin in its full strength may be recovered more completely from the pectin containing fruit.

It is a further object of this invention to provide a process for extracting pectin from citrus fruits, wherein the fruit rinds are first divided into slices of substantially equal thickness and subjected, after the juices have been removed, to treatment with alcohol, whereby the enzymes are rendered inactive, the action of the strong acid juices inhibited, the intercellular materials dissolved, the water removed and the rind rendered tough and non-pulpy for subsequent extraction and draining steps.

Other and further important objects of this invention will be apparent from the disclosures in the specification and the appended claims.

After the citrus fruits are washed, they are subjected to pressure, either whole or in large pieces, to extract most of the juices contained. Without loss of time, the peel is then cut or sliced into thin, even pieces of substantially equal thickness. These slices may be washed free from excess acid, but the washing is not necessary. The advantage of washing is in the recovery of essential oils liberated by the slicing. The sliced fruit rinds are at once subjected to the action of strong alcohol, preferably 95% grain alcohol, which immediately renders the enzymes inactive and inhibits the action of the strong acid juices on the pectin. The alcohol, of course, being miscible with the water in the fruit rinds, tends largely to replace the water in the rinds. The alcohol also dissolves intercellular materials and shrinks the rinds or peels, making them tough and non-pulpy. This action is completed in a few hours, depending upon the thickness of the pieces. The alcohol is then removed, either by draining or rinsing with a portion of water. Weakly acidified water is now added and the mass subjected to sufficient heat to raise the temperature to the boiling point.

During the boiling process, the acid liquid displaces the alcohol and dissolves the pectin material out from the interior of the peel very rapidly. The rapidity of the solvent action is so great that the time for dissolving of the pectin is reduced to substantially one-fourth of the time formerly required. The shortened boiling period preserves the strength of the pectin. During the boiling of the mass, any vapors emanating can be condensed to recover the alcohol remaining after the alcohol treatment.

The acid solution containing the dissolved pectin may be removed from the fruit rind in any convenient method, preferably by draining in a perforated rotating reel or drum, slightly sloping to one end. Since the alcohol treatment hardens the fibers and removes the slime forming films, the draining is accomplished with comparative ease. The fruit rinds may be extracted as many times as necessary, but ordinarily, three extractions are sufficient to give close to theoretical yield.

The pectin extract may then be filtered or allowed to stand until the granular material has settled out. Filtration through paper pulp is preferred.

In order to prepare a liquid pectin of definite jelly strength, the pectin solution may be concentrated in vacuo. If, however, powdered pectin is desired, the concentrated liquid is precipitated with alcohol and the precipitate dried and powdered. The powder is then standardized with sugar to a definite strength. It is thus apparent that my improved method preserves the maximum strength of the existing jell property in the pectin and also results in a much higher yield than was formerly deemed possible. The use of alcohol does not proportionately increase the cost of extracting the pectin, since the alcohol may be easily recovered and reused. In place of alcohol, other liquids of alcoholic nature, which are miscible with water but do not dissolve pectin, may be used.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. The process of extracting pectin from citrus fruit, which comprises subjecting the fruit to pressure to extract the juices, slicing the fruit rind into thin slices of substantially equal thickness, treating the sliced rind with alcohol and dissolving out the pectin by means of a hot weakly acid solution.

2. The process of extracting pectin from citrus fruit, which comprises subjecting the fruit to pressure to extract the juices, slicing the fruit rind into thin slices of substantially equal thickness, treating the sliced rind with alcohol, removing the alcohol, and dissolving out the pectin by means of a hot weakly acid solution.

3. The process of extracting pectin from citrus fruit, which comprises subjecting the fruit to pressure to extract the juices, slicing the fruit rind into thin slices of substantially equal thickness, treating the sliced rind with alcohol, removing the alcohol, dissolving out the pectin by means of a hot weakly acid solution, and concentrating the pectin solution so obtained to a definite jell standard.

4. The process of extracting pectin from citrus fruit, which includes the step of subjecting the thinly sliced fruit rind to treatment with alcohol and subsequently to an extraction with weakly acid water, whereby a freely draining mass is produced from which the acid water solution of the pectin may be readily separated.

5. The process of extracting pectin from citrus pectin-containing fruit, which comprises extracting the fruit juices by pressure, dividing the fruit rind into relatively thin pieces, treating the rind with strong alcohol to render enzymes present inactive and to inhibit the action of the acid juices, removing the alcohol, boiling the treated rind with a solvent for pectin and separating the pectin solution.

6. In the process of extracting pectin from fruit, the step of subjecting the fruit rind to treatment with an alcoholic liquid incapable of dissolving pectin, but miscible with water and adapted to harden the fruit rind.

In testimony whereof I have hereunto subscribed my name.

HERBERT T. LEO.